(12) United States Patent
Tanaka

(10) Patent No.: US 11,017,449 B2
(45) Date of Patent: May 25, 2021

(54) FLOWERBED SALES ORDER SYSTEM AND PLANT ARRANGEMENT PLANNING SUPPORT PROGRAM

(71) Applicant: Suiko Tanaka, Miyagi (JP)

(72) Inventor: Suiko Tanaka, Miyagi (JP)

(*) Notice: Subject to any disclaimer, the term of this patent is extended or adjusted under 35 U.S.C. 154(b) by 162 days.

(21) Appl. No.: 16/314,733

(22) PCT Filed: Feb. 22, 2017

(86) PCT No.: PCT/JP2017/006643
§ 371 (c)(1),
(2) Date: Jan. 2, 2019

(87) PCT Pub. No.: WO2018/008182
PCT Pub. Date: Jan. 11, 2018

(65) Prior Publication Data
US 2020/0175567 A1      Jun. 4, 2020

(30) Foreign Application Priority Data

Jul. 6, 2016   (JP) .............................. JP2016-134367

(51) Int. Cl.
*G06Q 30/06* (2012.01)
*G06T 15/00* (2011.01)
*A01G 9/28* (2018.01)

(52) U.S. Cl.
CPC ........... *G06Q 30/0621* (2013.01); *A01G 9/28* (2018.02); *G06Q 30/0601* (2013.01);
(Continued)

(58) Field of Classification Search
None
See application file for complete search history.

(56) References Cited

U.S. PATENT DOCUMENTS 7,264,547 B1 * 9/2007 Norimatsu .............. A63F 13/10
463/31
9,501,588 B1 * 11/2016 Rowe ...................... G06T 17/05
(Continued)

FOREIGN PATENT DOCUMENTS

JP   2002-117243   4/2002
JP   2004-029941   1/2004
(Continued)

OTHER PUBLICATIONS

U.S. Patent and Trademark Office, Specification of U.S. Appl. No. 62/199,410, to McDevitt, John, p. 1, filed Jul. 31, 2015. (Year: 2015).*

(Continued)

*Primary Examiner* — Nicholas D Rosen
(74) *Attorney, Agent, or Firm* — Greenblum & Bernstein, P.L.C.

(57) ABSTRACT

There is provided a flowerbed sales order system capable of freely design a desired flowerbed and ordering the designed flowerbed by a simple procedure.
The present invention relates to a flowerbed sales order system including a user terminal, a server apparatus capable of communicating with the user terminal, and an arrangement identificator which identifies arrangement of different colors and/or different types of plants for each of a plurality of regions included in a flowerbed, in which the user terminal includes an order placement request transmitter which transmits an order request of the flowerbed having the arrangement identified by the arrangement identificator by an operation of a user, and the server apparatus includes an order placement request receiver which receives the order request of the flowerbed.

10 Claims, 9 Drawing Sheets

(52) U.S. Cl.
CPC ....... *G06Q 30/0633* (2013.01); *G06T 15/005* (2013.01); *G06T 2210/61* (2013.01)

(56) References Cited

U.S. PATENT DOCUMENTS

| | | | | |
|---|---|---|---|---|
| 10,356,338 | B2* | 7/2019 | McDevitt | G06T 3/0012 |
| 2008/0243639 | A1* | 10/2008 | Mullaney | G06Q 30/0613 |
| | | | | 705/26.81 |
| 2009/0216661 | A1* | 8/2009 | Warner | G06Q 30/02 |
| | | | | 705/26.1 |
| 2011/0071919 | A1* | 3/2011 | Spry | G06Q 10/10 |
| | | | | 705/26.5 |
| 2011/0191708 | A1* | 8/2011 | Reed | G06F 3/04842 |
| | | | | 715/765 |
| 2014/0168412 | A1* | 6/2014 | Shulman | H04N 7/18 |
| | | | | 348/89 |
| 2014/0279181 | A1* | 9/2014 | Wills | A01G 27/02 |
| | | | | 705/26.5 |
| 2017/0034501 | A1* | 2/2017 | McDevitt | G06T 3/0012 |
| 2017/0273249 | A1 | 9/2017 | Takeuchi | |
| 2017/0330273 | A1* | 11/2017 | Holt | H04N 9/3173 |
| 2020/0402131 | A1* | 12/2020 | Tanaka | G06Q 30/0282 |

FOREIGN PATENT DOCUMENTS

| | | |
|---|---|---|
| JP | 2005-063083 | 3/2005 |
| JP | 2015-119649 | 7/2015 |
| WO | 2016/031354 | 3/2016 |

OTHER PUBLICATIONS

U.S. Patent and Trademark Office, Specification of U.S. Appl. No. 62/199,410, to McDevitt, John, p. 2, filed Jul. 31, 2015. (Year: 2015).*
U.S. Patent and Trademark Office, Specification of U.S. Appl. No. 62/199,410, to McDevitt, John, p. 3, filed Jul. 31, 2015. (Year: 2015).*
U.S. Patent and Trademark Office, Specification of U.S. Appl. No. 62/199,410, to McDevitt, John, p. 4, filed Jul. 31, 2015. (Year: 2015).*
U.S. Patent and Trademark Office, Specification of U.S. Appl. No. 62/199,410, to McDevitt, John, p. 5, filed Jul. 31, 2015. (Year: 2015).*
U.S. Patent and Trademark Office, Specification of U.S. Appl. No. 62/199,410, to McDevitt, John, p. 6, filed Jul. 31, 2015 (Year: 2015).*
U.S. Patent and Trademark Office, Specification of U.S. Appl. No. 62/199,410, to McDevitt, John, p. 7, filed Jul. 31, 2015. (Year: 2015).*
U.S. Patent and Trademark Office, Specification of U.S. Appl. No. 62/199,410, to McDevitt, John, p. 8, filed Jul. 31, 2015. (Year: 2015).*
U.S. Patent and Trademark Office, Specification of U.S. Appl. No. 62/199,410, to McDevitt, John, p. 9, filed Jul. 31, 2015. (Year: 2015).*
U.S. Patent and Trademark Office, Specification of U.S. Appl. No. 62/199,410, to McDevitt, John, p. 10, filed Jul. 31, 2015. (Year: 2015).*
U.S. Patent and Trademark Office, Specification of U.S. Appl. No. 62/199,410, to McDevitt, John, p. 11, filed Jul. 31, 2015. (Year: 2015).*
Schreiber Translations, English translation of JP 2005-063083, to Kadota, done Sep. 28, 2020. (Year: 2020).*
Schreiber Translations, English translation of JP 2002-117243, to Sato et al., done Sep. 29, 2020. (Year: 2020).*
Official Communication issued in International Bureau of WIPO Patent Application No. PCT/JP2017/006643, dated Mar. 21, 2017, along with an English transaltion thereof.

* cited by examiner

FIG. 4

| 42 | 43 | 44 | 45 | 46 |
|---|---|---|---|---|
| PLANT | COLOR | PLANTING TIME | APPRECIATION TIME | PHOTOGRAPH DATA |
| HYDRANGEA | BLUE | MARCH | JULY | DATA ID 0001 |
|  | PURPLE | MARCH | JULY | DATA ID 0002 |
|  | RED | MARCH | JULY | DATA ID 0003 |
|  | PINK | MARCH | JULY | DATA ID 0004 |
|  | WHITE | MARCH | JULY | DATA ID 0005 |
| CARNATION | RED | APRIL TO JUNE, SEPTEMBER, OCTOBER | SEPTEMBER, OCTOBER APRIL TO JUNE, | DATA ID 0006 |
|  | BLUE | APRIL TO JUNE, SEPTEMBER, OCTOBER | SEPTEMBER, OCTOBER APRIL TO JUNE, | DATA ID 0007 |
|  | PURPLE | APRIL TO JUNE, SEPTEMBER, OCTOBER | SEPTEMBER, OCTOBER APRIL TO JUNE, | DATA ID 0008 |
|  | PINK | APRIL TO JUNE, SEPTEMBER, OCTOBER | SEPTEMBER, OCTOBER APRIL TO JUNE, | DATA ID 0009 |
|  | ORANGE | APRIL TO JUNE, SEPTEMBER, OCTOBER | SEPTEMBER, OCTOBER APRIL TO JUNE, | DATA ID 0010 |

41

FLOWERBED SALES ORDER SYSTEM AND PLANT ARRANGEMENT PLANNING SUPPORT PROGRAM

TECHNICAL FIELD

The present invention relates to a flowerbed sales order system and a plant arrangement planning support program.

BACKGROUND ART

In recent years, so-called gardening to enjoy gardening in gardens and verandas has been widely recognized as a general hobby, there is a need to freely design a desired flowerbed and purchase the designed flowerbed by a simple procedure.

Furthermore, it is difficult to recognize the type and the number of plants necessary for forming a desired flowerbed and the like without considerable knowledge regarding gardening, and this is an obstacle when an inexperienced person in gardening actually challenges gardening.

In addition, it is difficult to accurately predict a completed form at a stage of planning arrangement and planting the plants in the flowerbed. There has been a problem in that a situation easily occurs in which the completed flowerbed and the like to which the plants are actually arranged and planted is different from the desired flowerbed and the like.

To solve the above problem, for example, Patent Literature 1 proposes a system for supporting design and construction of a flowerbed by using an information terminal. The system in Patent Literature 1 includes a flowerbed design means which determines a shape and color arrangement of a flowerbed by referring to data stored in a database, a condition setting means which sets a condition of the designed flowerbed, and a construction support means which selects materials necessary for constructing the designed flowerbed and creates a construction plan of the flowerbed. Patent Literature 1 discloses that a three-dimensional schematic diagram of the flowerbed determined by the flowerbed design means is displayed on a user terminal as a perspective view.

CITATION LIST

Patent Literature

Patent Literature 1: JP 2002-117243 A

SUMMARY OF INVENTION

Technical Problem

As described above, there is a need to freely design a flowerbed having a desired size, shape, pattern, and the like and to purchase the designed flowerbed by a simple procedure. However, a system which can easily design and make a sales order of the flowerbed does not exist so far.

By the way, an impression received from the flowerbed may widely vary depending on a direction and a height from which the flowerbed is viewed. However, the system disclosed in Patent Literature 1, a three-dimensional schematic diagram expressing a conceptional drawing of the flowerbed can be viewed only from a certain direction and angle. Therefore, a flowerbed formed based on the construction plan is not necessarily a flowerbed which is truly desired by a user.

Furthermore, since flowering times of plants vary according to the type of the plant, the impression received from the flowerbed varies according to the time. However, the system in Patent Literature 1 cannot display the three-dimensional schematic diagram of the flowerbed for each time. Therefore, there has been a problem in that it is not possible to support to form a flowerbed which is changed for each time.

The present invention has been made to solve the above problems. In other words, a first object of the present invention is to provide a flowerbed sales order system which can freely design a desired flowerbed and order the designed flowerbed by a simple procedure.

A second object of the present invention is to provide a plant arrangement planning support program capable of viewing a conceptional drawing of the flowerbed from a plurality of viewpoints having different directions and/or angles.

A third object of the present invention is to provide a plant arrangement planning support program capable of presenting a state of a flowerbed for each elapsed time from a planting time to a user.

Solution to Problem

The gists of the present invention are as follows.

[1] A flowerbed sales order system including a user terminal and a server apparatus capable of communicating with the user terminal, the system comprising: an arrangement identificator configured to identify arrangement of different colors and/or different types of plants for each of a plurality of regions included in a flowerbed, wherein the user terminal includes: an order placement request transmitter which transmits an order request of the flowerbed having the arrangement identified by the arrangement identificator by an operation of a user, and the server apparatus includes: an order placement request receiver which receives the order request of the flowerbed.

[2] The flowerbed sales order system according to [1], wherein the user terminal includes: a plant selector which accepts selection of a color and/or a plant to be arranged for each region by an operation instruction of the user, and the arrangement identificator identifies arrangement of the color and/or the plant for each region according to the color and/or the plant accepted by the plant selector.

[3] The flowerbed sales order system according to [2], wherein the plant selector changes plants of which selection can be accepted according to a time of planting and/or appreciation of the plant.

[4] The flowerbed sales order system according to any one of [1] to [3], wherein the user terminal includes a shape selector which accepts selection of a shape and a size of the flowerbed, and the arrangement identificator identifies arrangement of different colors and/or different types of plants for each of a plurality of regions included in the flowerbed having the shape and the size selected by the shape selector.

[5] A flowerbed sales order program to be executed by a server apparatus capable of communicating with a user terminal causing the server apparatus to function as: an arrangement identificator which identifies arrangement of different colors and/or different types of plants for each of a plurality of regions included in a flowerbed; and an order placement request receiver which receives an order request of the flowerbed from the user terminal.

[6] A flowerbed sales order program to be executed by a user terminal capable of communicating with a server apparatus causing the user terminal to function as: an arrangement identificator which identifies arrangement of different colors and/or different types of plants for each of a plurality of regions included in a flowerbed; and an order placement request transmitter which transmits an order request of the flowerbed having the arrangement identified by the arrangement identificator to the server apparatus by an operation of a user.

[7] A flowerbed sales order method executed by a flowerbed sales order system including a user terminal and a server apparatus capable of communicating with the user terminal, the method comprising: a step of identifying arrangement of different colors and/or different types of plants for each of a plurality of regions included in a flowerbed in the user terminal or the server apparatus; a step of transmitting an order request of the flowerbed having the arrangement of the different colors and/or the different types of the plants identified by an operation of a user in the user terminal; and a step of receiving the order request of the flowerbed in the server apparatus.

[8] A plant arrangement planning support program to make a computer device support a plant arrangement planning in a flowerbed causing the computer device to function as: an arrangement identificator which identifies arrangement of different colors and/or different types of plants for each of a plurality of regions included in a flowerbed; a display data storage which stores display data corresponding to each plant; and an image drawer which draws an image indicating a state of the flowerbed according to a position of each region and the plant arranged in each region based on the display data stored in the display data storage, wherein the image drawer is capable of drawing an image viewed from a different direction and/or angle relative to the flowerbed.

[9] A plant arrangement planning support program to make a computer device support a plant arrangement planning in a flowerbed causing the computer device to function as: an arrangement identificator which identifies arrangement of different colors and/or different types of plants for each of a plurality of regions included in a flowerbed; a display data storage which stores a plurality of pieces of display data according to an elapsed time from a planting time of the plant for each plant; and an image drawer which draws an image indicating a state of the flowerbed for each elapsed time from the planting time of the plant according to the position of each region and the plant arranged in each region based on the display data stored in the display data storage.

[10] The plant arrangement planning support program according to [8] or [9], wherein the image drawn by the image drawer is an image obtained by converting a state of a flowerbed in a virtual three-dimensional space into a two-dimensional image.

[11] The plant arrangement planning support program according to any one of [8] to [10], causing the computer device to function as: a plant selector which accepts selection of a plant to be arranged for each region by an operation instruction of a user, wherein the arrangement identificator identifies the arrangement of the plant for each region according to the plant accepted by the plant selector, and the plant selector changes the plant of which the selection is accepted according to the time of planting and/or appreciation of the plant.

[12] The plant arrangement planning support program according to any one of [8] to [11], causing the computer device to function as: an order request acceptor which accepts an order request by an operation instruction of the user; and an order reception confirmer which confirms an order reception of the flowerbed according to the arrangement of the plant identified by the arrangement identificator when the order request is accepted.

[13] A plant arrangement planning support equipment to execute a support of a plant arrangement planning in a flowerbed, the device comprising: an arrangement identificator configured to identify arrangement of different colors and/or different types of plants for each of a plurality of regions included in a flowerbed; a display data storage configured to store display data corresponding to each plant; and an image drawer configured to draw an image indicating a state of the flowerbed according to a position of each region and the plant arranged in each region based on the display data stored in the display data storage, wherein the image drawer is capable of drawing an image viewed from a different direction and/or angle relative to the flowerbed.

[14] A plant arrangement planning support equipment to execute a support of a plant arrangement planning in a flowerbed, the device comprising: an arrangement identificator configured to identify arrangement of different colors and/or different types of plants for each of a plurality of regions included in a flowerbed; a display data storage configured to store a plurality of pieces of display data according to an elapsed time from a planting time of the plant for each plant; and an image drawer configured to draw an image indicating a state of the flowerbed for each elapsed time from the planting time of the plant according to the position of each region and the plant arranged in each region based on the display data stored in the display data storage.

[15] A plant arrangement planning support method to make a computer device support a plant arrangement planning in a flowerbed, the method comprising: a step of identifying arrangement of different colors and/or different types of plants for each of a plurality of regions included in the flowerbed; and a step of drawing an image indicating a state of the flowerbed according to a position of each region and the plant arranged in each region based on display data corresponding to each plant stored in a storage, wherein the step of drawing can draw an image viewed from a different direction and/or angle relative to the flowerbed.

[16] A plant arrangement planning support method to make a computer device support a plant arrangement planning in a flowerbed, the method comprising: a step of identifying and arranging arrangement of different colors and/or different types of plants for each of a plurality of regions included in the flowerbed; and a step of drawing an image indicating a state of the flowerbed for each elapsed time from a planting time of the plant according to a position of each region and the plant arranged in each region based on a plurality of pieces of display data according to the elapsed time from the planting time of the plant for each plant stored in a storage.

[17] A plant display system including a display device comprising: a virtual space storage configured to store information regarding a state of a virtual space; a plant information storage configured to store information regarding a state of a plant; an image generator configured to generate images of the virtual space and the plant to be displayed on the display device according to a position and/or a direction of the display device; and an image display configured to display the generated image on the display device.

[18] A plant display system including a user terminal and a server apparatus capable of communicating with the user terminal, the system comprising: a storage configured to store information regarding a state of a plant and information regarding a marker associated with the information; an imager configured to image the marker and a background; a discerner configured to discern the marker; a plant identificator configured to identify the plant from the discerned marker; an image generator configured to generate an image of the identified plant; and an image display configured to display the generated image and the imaged background.

Advantageous Effects of Invention

The invention according to [1] includes an arrangement identificator which can identify arrangement of different colors and types of plants in a flowerbed and design the flowerbed and an order request transmitter/receiver which transmits an order request of the flowerbed designed by a user terminal and receives the order request by a server apparatus. That is, according to the invention described in [1], it is possible to order the flowerbed designed by the user.

The invention according to [8] includes an image drawer which can draw an image indicating a state of the flowerbed which is a conceptional drawing of the flowerbed from a different direction and/or angle relative to the flowerbed. That is, according to the invention described in [8], since the conceptional drawing of the flowerbed planned by the user can be viewed from the plurality of viewpoints, a situation hardly occurs in which the actually formed flowerbed is different from an image of the user, and it is possible to form a flowerbed close to the image of the user.

The invention according to [9] includes an image drawer which draws an image indicating a state of a flowerbed for each elapsed time from a planting time of the plant. That is, according to the invention described in [9], the state of the flowerbed for each elapsed time from the planting time of the plant can be predicted before the flowerbed is actually formed. Therefore, the user can recognize a state of the flowerbed which changes according to time, and it is possible to form a flowerbed which is attractive throughout the year.

BRIEF DESCRIPTION OF THE DRAWINGS

FIG. 4 is a diagram illustrating an example of a plant data table corresponding to at least one of the embodiments of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
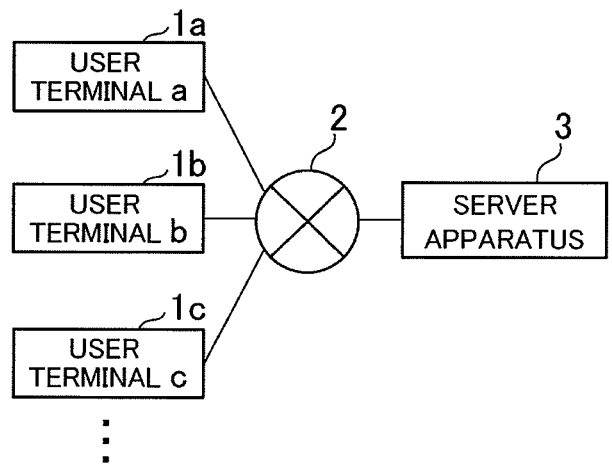
FIG. 1 is a diagram illustrating a configuration of a flowerbed sales order system corresponding to at least one of embodiments of the present invention.

FIG. 1 is a diagram illustrating a configuration of a flowerbed sales order system corresponding to at least one of embodiments of the present invention. As illustrated in FIG. 1, the flowerbed sales order system according to the present embodiment includes a plurality of user terminals 1 (user terminals 1a, 1b, 1c . . . ), a communication network 2, and a server apparatus 3.

The user terminal 1 is a terminal which is used by a user to select an area and a shape of a flowerbed and select a type and arrangement of plants to be planted in the flowerbed, and the like. As the user terminal 1, for example, a personal computer, a smartphone, a tablet terminal, a mobile phone, a PDA, and the like are exemplified. However, the user terminal 1 is not limited to these. It is preferable that the user terminal 1 be an apparatus which can be connected to the server apparatus 3 via the communication network 2.

For the communication network 2, for example, various known wired or wireless communication networks can be used such as the Internet, a wired or wireless public telephone network, a wired or wireless LAN, a dedicated line, and the like.

The server apparatus 3 is a management and operation server which exchanges information with the user terminal 1, stores and analyzes a communication history with the user terminal 1.

Figure 2:
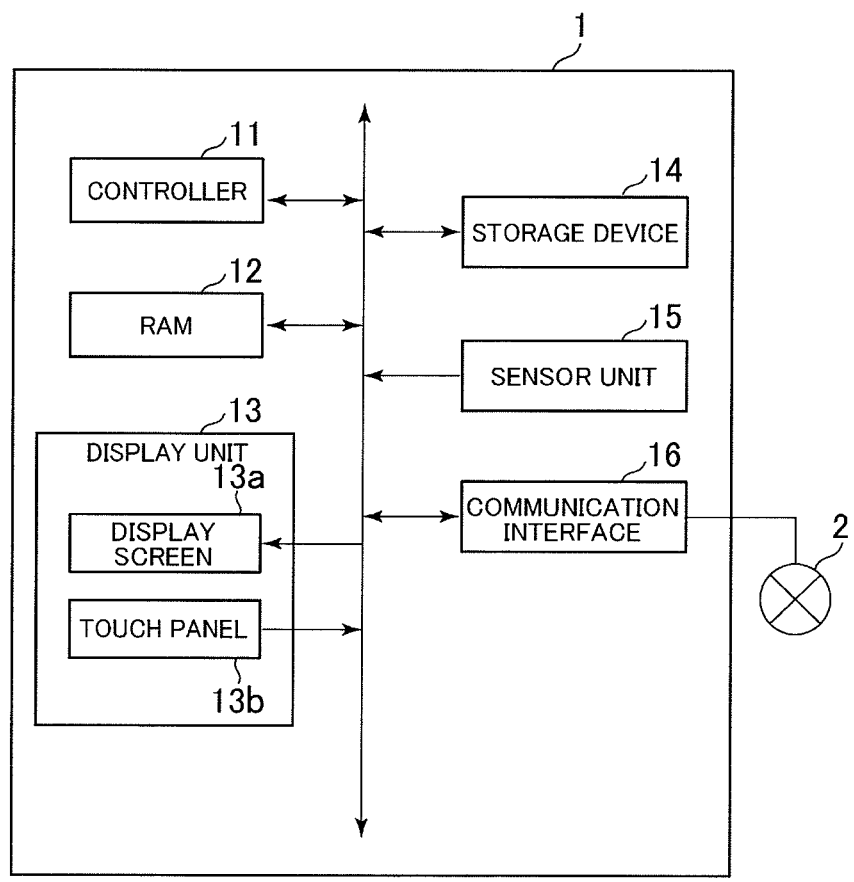
FIG. 2 is a block diagram illustrating a configuration of a user terminal corresponding to at least one of the embodiments of the present invention.

FIG. 2 is a block diagram illustrating a configuration of a user terminal corresponding to at least one of the embodiments of the present invention. As illustrated in FIG. 2, the user terminal 1 includes a controller 11, a RAM 12, a display unit 13, a storage device 14, a sensor unit 15, a communication interface 16, and the like and can be connected to the communication network 2 via the communication interface 16.

The controller 11 refers to a program and data stored in a storage device such as the storage device 14 and executes the program and the data. The RAM 12 is a work area of the controller 11. An operation by the user relative to a touch panel 13b provided in the display unit 13 and information detected by the sensor unit 15 are stored in the RAM 12 as input information, and the controller 11 executes various computational process based on the input information.

The display unit 13 includes a display screen 13a which displays an image indicating information necessary for performing plant arrangement planning such as selection of the area and the shape of the flowerbed and the type and the arrangement of the plants to be planted in the flowerbed by the user and a state of the flowerbed identified by selection of the user. Furthermore, the display unit 13 includes the touch panel 13b which detects pressing by a finger, stylus, and the like and a movement of a position of the finger and the like on the panel to detect a change in the coordinate position of the finger and the like. The display screen 13a and the touch panel 13b may be integrally formed.

The storage device 14 is used as a storage region to save programs and data and can store data received from the server apparatus.

The sensor unit 15 includes a GPS sensor. Furthermore, the sensor unit 15 may include other various sensors, for example, a fingerprint authentication sensor, a proximity sensor, an acceleration sensor, a gyro sensor, a magnetic sensor, a luminance sensor, or an atmospheric pressure sensor.

Figure 3:
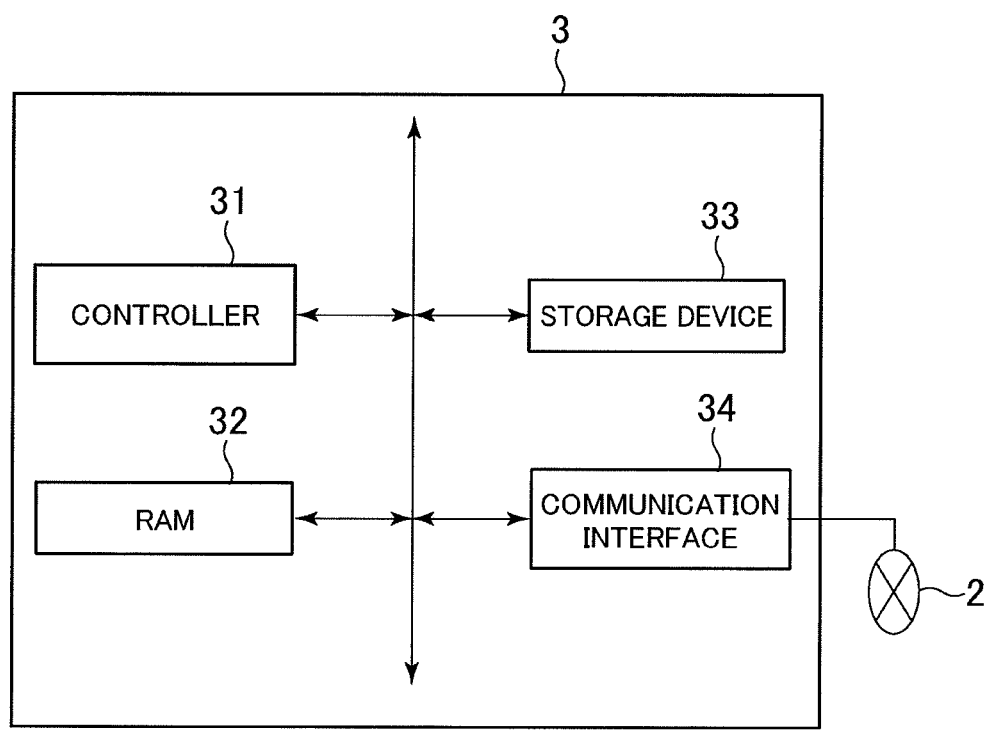
FIG. 3 is a block diagram illustrating a configuration of a server apparatus corresponding to at least one of the embodiments of the present invention.

FIG. 3 is a block diagram illustrating a configuration of a server apparatus corresponding to at least one of the embodiments of the present invention. As illustrated in FIG. 3, the server apparatus 3 includes a controller 31, a RAM 32, a storage device 33, a communication interface 34, and the like and can be connected to the communication network 2 via the communication interface 34.

The controller 31 refers to a program and data stored in the storage device 33 and executes the program and the data. The RAM 32 is a work area of the controller 31. The storage device 33 stores data which is input to the user terminal 1 and received via the communication interface 34.

Next, a function of the user terminal 1 will be described. The user terminal 1 has a flowerbed shape input function, a planting time input function, a plant arrangement input function, a plant arrangement planning transmission function, a flowerbed state image reception function, a viewpoint change instruction function, a time change instruction function, a change instruction transmission function, a seedling number reception function, and an order placement request transmission function.

The flowerbed shape input function has a function for inputting information regarding the shape and the area of the flowerbed desired by the user. The information regarding the shape of the flowerbed is input by, for example, forming the shape of the flowerbed desired by the user on the display screen 13a by displaying square cells including a plurality of squares on the display screen 13a and performing an operation of tapping of the square cell. In addition, the information regarding the area of the flowerbed is input by, for example, making the user input an actual length corresponding to one side of the square forming the square cell.

The planting time input function has a function for inputting information regarding a planting time and/or an appreciation time desired by the user. The planting time and the like is input by, for example, displaying one year on the display screen 13a as a bar and swiping the bar. Since the planting time and a flowering time of a plant are slightly different depending on a region, it is preferable that the planting time input function further has a function for inputting information regarding the region where the flowerbed is formed. Note that, the input of the information regarding the region where the flowerbed is formed may be omitted by setting a current position of the user terminal 1 detected by the GPS sensor included in the sensor unit 15 and an address of the user registered in advance as the flowerbed forming region.

The plant arrangement input function has a function for inputting the arrangement and the type of the plant in the flowerbed for each region forming the flowerbed. The arrangement and the type of the plant are input by, for example, selecting a color and a plant desired by the user for each square cell of the plurality of square cells included in the flowerbed displayed on the display screen 13a. For example, in a case where the user performs an operation for tapping the square cell included in the flowerbed on the display screen 13a and the like, the selection of the color is input by making a pop-up display of a color palette including a plurality of colors and making the user select a desired color relative to the tapped square cell from among the colors displayed in the color palette. Furthermore, the type of the plant is input by displaying information regarding plants corresponding to the color selected by the user on the display screen 13a and making the user select a desired plant from among displayed plants. In a case where the planting time and the like of the plant is selected by the planting time input function, only information regarding the plant corresponding to the color selected by the user and corresponding to the planting time selected by the user is displayed on the display screen 13a. The color and the plant desired by the user may be collectively input to the plurality of square cells.

The plant arrangement planning transmission function has a function for transmitting information regarding the plant arrangement planning input by the user to the server apparatus 3 via the communication interface 16. Here, the term "plant arrangement planning" means a flowerbed forming plan of the user including at least the shape and the area of the flowerbed, and the arrangement and the type of the plants in the flowerbed.

The flowerbed state image reception function has a function for receiving an image indicating a state of the flowerbed formed by the server apparatus 3 based on the plant arrangement planning of the user from the server apparatus 3 via the communication interface 16. The received image indicating the state of the flowerbed is displayed on the display screen 13a. Here, the term "image indicating the state of the flowerbed" means a conceptional drawing in a case where the flowerbed is formed based on the plant arrangement planning of the user.

The viewpoint change instruction function has a function for inputting an instruction for changing the image indicating the state of the flowerbed received from the server apparatus 3 to an image viewed from a different direction and/or an angle. The viewpoint change instruction is input by, for example, displaying a button corresponding to a predetermined direction and/or an angle on the display screen 13a and performing an operation such as tapping the button corresponding to a direction and/or an angle desired by the user.

The time change instruction function has a function for inputting an instruction for changing the image indicating the state of the flowerbed received by the server apparatus 3 to an image indicating a state of a flowerbed at a specific time. The time change instruction is input by, for example, displaying one year on the display screen 13a as a bar and swiping the bar.

The change instruction transmission function has a function for transmitting information regarding the viewpoint change instruction and/or the time change instruction input by the user to the server apparatus 3 via the communication interface 16.

The seedling number reception function has a function for receiving information regarding the number of seeds and/or seedings of the plants required when the flowerbed is formed based on the plant arrangement planning of the user from the server apparatus 3 via the communication interface 16. The seedling number reception function may further have a function for receiving information regarding intervals between the plants to be planted in each region forming the flowerbed and an estimated cost from the server apparatus 3 via the communication interface 16.

The order placement request transmission function has a function for transmitting an order request regarding the seeds and/or seedings of the plants required when the flowerbed is formed based on the plant arrangement planning of the user to the server apparatus 3 via the communication interface 16.

Next, a function of the server apparatus 3 will be described. The server apparatus 3 has a plant arrangement planning reception function, a plant arrangement identification function, a display data storage function, a flowerbed state drawing function, a flowerbed state image transmission function, a change instruction reception function, a seedling number calculation function, a seedling number transmission function, an order request reception function, and an order reception confirmation function.

The plant arrangement planning reception function has a function for receiving information regarding the plant arrangement planning input by the user from the user terminal 1 via the communication interface 16 and storing the information in the storage device 33.

The plant arrangement identification function has a function for identifying arrangement of different colors and/or the different types of plants for each region of a plurality of regions included in the flowerbed based on the plant arrangement planning of the user received by the plant arrangement planning reception function.

The display data storage function has a function for storing display data regarding a plant used for gardening. As the display data stored in the display data storage function, for example, graphic data including a plurality of polygons is preferable. Furthermore, the display data may be photograph data of the plant viewed from a plurality of different directions or angles corresponding to the direction and the angle relative to the flowerbed which can be input for each of the different colors and/or different types of plants.

The flowerbed state drawing function has a function for drawing the image indicating the state of the flowerbed identified by the plant arrangement identification function according to the arrangement of the regions in the flowerbed and the plants arranged in each region based on the display data stored in the display data storage function.

The image to be drawn is preferably a two-dimensional image obtained by perspective transformation of the state of the flowerbed in a virtual three-dimensional space with a virtual screen. Objects of the plants which have been arranged and planted are provided in the virtual three-dimensional space, and the state of the flowerbed viewed from a different angle can be displayed as a two-dimensional image by changing a position of a virtual camera.

Note that, the position of the virtual screen is determined according to the position of the virtual camera, and an image projected on the virtual screen is displayed as a two-dimensional image. In a case where the image projected on the virtual screen is generated by perspective transformation, hidden surface removal is performed for removing a surface which is hidden by the other object positioned in front of the object. As a method of the hidden surface removal, for example, a Z buffer method can be used.

Graphic data in the virtual three-dimensional space may include, for example, a plurality of polygons. Each of plant objects arranged and planted in the virtual three-dimensional space includes a plurality of polygons arranged so as to express the shape of the plant. Each of these polygons is defined by identifying the coordinate of each vertex in the local coordinate system.

When arrangement of different colors and/or the different types of plants is identified for each of the plurality of regions included in the flowerbed by the plant arrangement identification function, a plant object of the identified plant is arranged in each region in the virtual space. These arranged plant objects (for example, center of flowerbed) are a focal point of the virtual camera. When a change in the direction and the angle relative to the flowerbed is input by the user, only the position of the virtual camera is changed while the position of the focal point of the virtual camera is fixed, and an image from the different direction and the different angle relative to the flowerbed can be obtained. In this case, the direction and the angle relative to the flowerbed may be continuously changed or may be discontinuously changed stepwise.

Furthermore, the state of the flowerbed displayed on the display screen can be changed according to an elapsed time from the planting time of the plant. Regarding the plant object including the polygons, a plurality of pieces of object data is stored in advance according to the elapsed time from the planting time of the plant for each of different colors and/or different types of plants. When a change in the time to be displayed is input by the user, the plant objects arranged in each region are replaced with plant objects corresponding to the changed time for each color and type of the plant. With this configuration, since a growing or changing state of the plants in the flowerbed can be confirmed, unbalance can be recognized in advance such that some flowers are blooming and some flowers are not blooming according to the time.

As the graphic data in the virtual three-dimensional space, photograph data can be used unlike the object including the polygons. The photograph data of the plant viewed from a plurality of different directions or angles corresponding to the direction and the angle relative to the flowerbed which can be input is stored in advance for each of the different colors and/or the different types of plants. In this case, the direction and the angle relative to the flowerbed can be changed stepwise. When arrangement of different colors and/or different types of plants is identified for each of the plurality of regions included in the flowerbed by the plant arrangement identification function, the photograph data regarding the identified plant is arranged in each region to be perpendicular to a visual axis of the virtual camera.

When a change in the direction and the angle relative to the flowerbed is input, the arranged photograph data is replaced with photograph data according to the changed direction relative to the flowerbed. The replaced photograph data is arranged to be perpendicular to the visual axis of the virtual camera. With this configuration, since the plants arranged and planted by using the photograph data can be expressed as a two-dimensional image, the state of the flowerbed closer to an actual state can be displayed.

Furthermore, the state of the flowerbed displayed on the display screen can be changed according to an elapsed time from the planting time of the plant. A plurality of pieces of photograph data are stored in advance according to the elapsed time from the time when planting the plant for each of the different colors and/or the different types of plants. When a change in the time to be displayed is input by the user, the photograph data arranged in each region is replaced with photograph data corresponding to the changed time for each color and type of the plant.

Furthermore, as a simpler method, the arrangement of the different colors and/or the different types of plants is identified for each of the plurality of regions included in the flowerbed, cubic objects with colors and patterns according to the plants arranged in each region are arranged, and a two-dimensional image can be obtained by performing perspective transformation on these cubic objects by the virtual screen. In this case, when a change in the direction and the angle relative to the flowerbed is input, the position of the virtual camera is changed while the position of the focal point of the virtual camera is fixed, and an image viewed from the different direction and the different angle relative to the flowerbed can be obtained. The direction and the angle relative to the flowerbed may be continuously changed or may be discontinuously changed stepwise. With this configuration, the state of the flowerbed from a different angle and direction can be displayed while suppressing a processing load to be small.

Furthermore, the plant display system including a display device may be a plant display system including a virtual space storage which stores information regarding a state of the virtual space, a plant information storage which stores information regarding a state of the plant, an image generator which generates images of the virtual space and the plant to be displayed on the display device according to a position and/or a direction of the display device, and an image display which displays the generated image on the display device.

With the above configuration, since the state of the plant can be displayed by using the technology of Virtual Reality (VR), the user can more specifically grasp an image of the flowerbed and the implantation which are actually constructed.

As the display device, a known head mount display can be used. The head mount display means general displays which can be worn on the head. A mode for wearing the display on the head is not particularly limited. However, for example, a method of wearing the display on the head as a cap, a method of wearing the display on a face as glasses, a method of attaching the display on a part of the head, or a method of covering the head with the display by extending the display from a part of the body can be exemplified. By using a wearing tool with which the user terminal such as a smartphone can be fixed to a head of a person instead of the head mount display, the virtual space can be displayed by using the user terminal instead of a display.

The virtual space storage can store the information regarding the state of the virtual space. As the information regarding the state of the virtual space, a plurality of backgrounds related to places which are generally assumed as places where the flowerbeds and the implantations are provided can be stored in a computer device in advance.

The term "virtual space" is, for example, a space defined by a program and data and indicates a virtual space generated by a computer. The user can select a background close to an atmosphere of the place where the flowerbed and the implantation are planned to be provided from among the plurality of virtual space options.

The type of the virtual space which can be selected is not particularly limited. However, the type is, for example, a park, a school, a home garden, or a theme park. Furthermore, as the virtual space, it is possible that an image imaging 360 degrees (omnidirectional photograph, celestial sphere photograph, and the like) is imaged by the user and the imaged image of 360 degrees is stored and used as the background of the virtual space.

As the computer device, a known computer device can be used as long as it can be connected to the display device such as a head mount display by communication and can perform calculation and input/output to execute image display processing.

The plant information storage can store the information regarding the state of the plant. The information regarding the state of the plant is information regarding types and colors of plants used for the flowerbed and the implantation which are temporarily registered by making the plant arrangement planning, for example, plants used for a flowerbed and an implantation designed by the user. The information regarding the state of the plant can be stored in the storage device of the computer device or the user terminal.

The image generator can generate images of the virtual space and the plant to be displayed on the display device according to the position and/or the direction of the display device. Each time when the position or the direction of the display device such as the head mount display is changed, the computer device generates a new image by synthesizing the image of the virtual space and the image of the plant, and the information regarding the generated image is transmitted to the display device such as the head mount display. The method of generating the image is not particularly limited. However, an image can be generated by using the perspective transformation method described above and the like.

The image display can display the generated image on the display device. By continuously displaying the generated images frame by frame, a video of the virtual space and the plant is continuously displayed according to a change in the position or the direction of the display device such as a head mount display.

Figure 10:
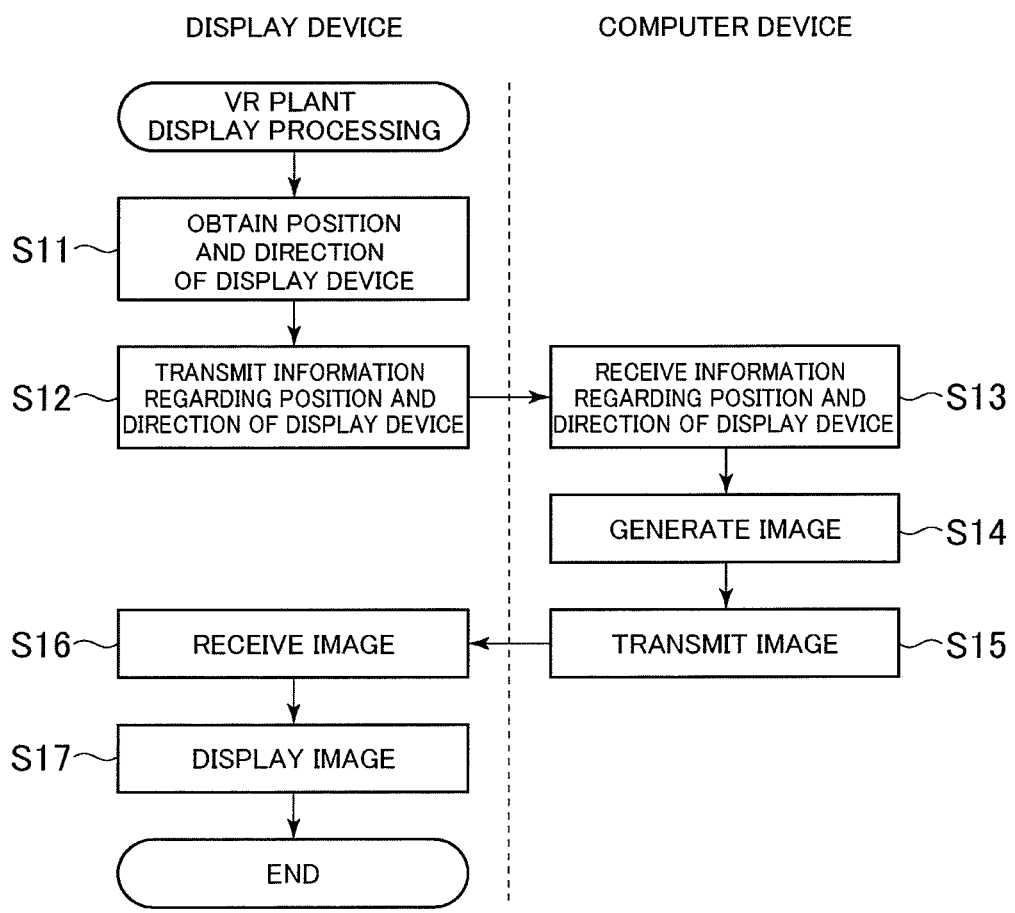
FIG. 10 is a diagram illustrating an example of a flowchart of processing of displaying a plant by using the VR corresponding to at least one of the embodiments of the present invention.

Processing of displaying the image of the plant by using the VR technology will be described with reference to a flowchart illustrated in FIG. 10. First, at the display device, the position and/or the direction of the display device is obtained (step S11). The display device transmits information regarding the position and/or the direction of the display device (step S12), and the computer device receives the information regarding the position and/or the direction of the display device (step S13).

The computer device generates images of the virtual space and the plant to be displayed on the display device according to the position and/or the direction of the display device (step S14) and transmits information regarding the generated image (step S15). When the display device receives the information regarding the generated image (step S16), the display device displays the images of the virtual space and the plant (step S17).

As described above, by continuously executing the processing of obtaining the position and/or the direction of the display device to the processing of displaying the images of the virtual space and the plant, the video of the virtual space and the plant is continuously displayed.

Furthermore, the plant display system including the user terminal and the server apparatus which can communicate with the user terminal may be a plant display system which includes a storage which stores the information regarding the state of the plant and information regarding a marker associated with the above information, an imager which images the marker and the background, a discerner which discerns the marker, a plant identificator which identifies the plant from the discerned marker, an image generator which generates an image of the identified plant, and an image display which displays the generated image and the imaged background.

With the above configuration, since the state of the plant can be displayed by using the technology of Augmented Reality (AR), the user can more specifically grasp an image of the flowerbed and the implantation which are actually constructed.

The storage stores the information regarding the state of the plant and the information regarding the marker associated with the information regarding the state of the plant. The information regarding the state of the plant is information regarding types and colors of plants used for the flowerbed and the implantation which are temporarily registered by making the plant arrangement planning, for example, plants used for a flowerbed and an implantation designed by the user. The above information can be stored in the storage device of the server apparatus and the user terminal to be used.

As a marker of an AR image of the plant, a two-dimensional barcode can be used. The marker may be generated each time when a marker generation request is received and may be generated in advance when the plant arrangement planning is made and information of the flowerbed and the implantation is temporarily registered. The information regarding the marker can be stored in the storage device of the server apparatus.

The imager images the marker and the background. The user places the marker generated based on the information of the designed flowerbed and implantation and the like at a place where the user desires to provide the flowerbed and the implantation, and the background in which the plant is placed is imaged by a camera function of the user terminal. A marker of the plant output by a marker output device can be used.

The type of the marker output device is not particularly limited as long as the device can receive marker information and can output the marker. The marker output device is, for example, a laptop computer, a desktop personal computer, a printer, or a tablet terminal.

In a case where a laptop computer, a desktop personal computer, or the like are used as the marker output device, a mode can be used in which the marker is output by printing the marker on a paper medium from a printer and the like in response to a predetermined output operation relative to the laptop computer and the desktop personal computer. Furthermore, a mode may be used in which the printer and the user terminal are directly connected to each other by communication and the printer directly prints the marker.

In a case where a tablet terminal and the like is used as the marker output device, the marker can be output by displaying the marker on a display screen of the tablet terminal. Furthermore, a mode can be used in which the marker is printed and output on a paper medium from the printer and the like in response to a predetermined output operation relative to the tablet terminal.

The discerner discerns the marker. The marker can be discerned by imaging an entire surface of the marker at an appropriate focal point distance from the front. In a case where the marker can be discerned, the marker information is obtained by the user terminal, and the procedure proceeds to processing of identifying the plant. When the marker cannot be discerned, imaging by the user terminal is continued. The case where the marker cannot be discerned is, for example, a case where the marker is imaged from an oblique direction, a case where a part of the marker is not imaged, a case where the focal point of imaging does not match the marker, and the like.

The plant identificator identifies a plant from the discerned marker. The plant is identified by identify the location of data of the plant from information included in the marker such as an URL. The data of the plant can be stored in the storage device of the server apparatus.

The image generator generates an image of the identified plant. The image of the plant is generated according to the position and/or the direction of the user terminal. That is, each time when the user terminal is moved, an image according to the position and/or the direction of the user terminal is generated. The method of generating the image is not particularly limited. However, an image can be generated by using the perspective transformation method described above and the like.

The image display displays the generated image and the imaged background. The generated image of the plant is synthesized with the imaged background and displayed on the user terminal. With such a display mode, an AR image of the plant and a background video of an actual space are superimposed and displayed on the display screen of the user terminal.

Figure 11:
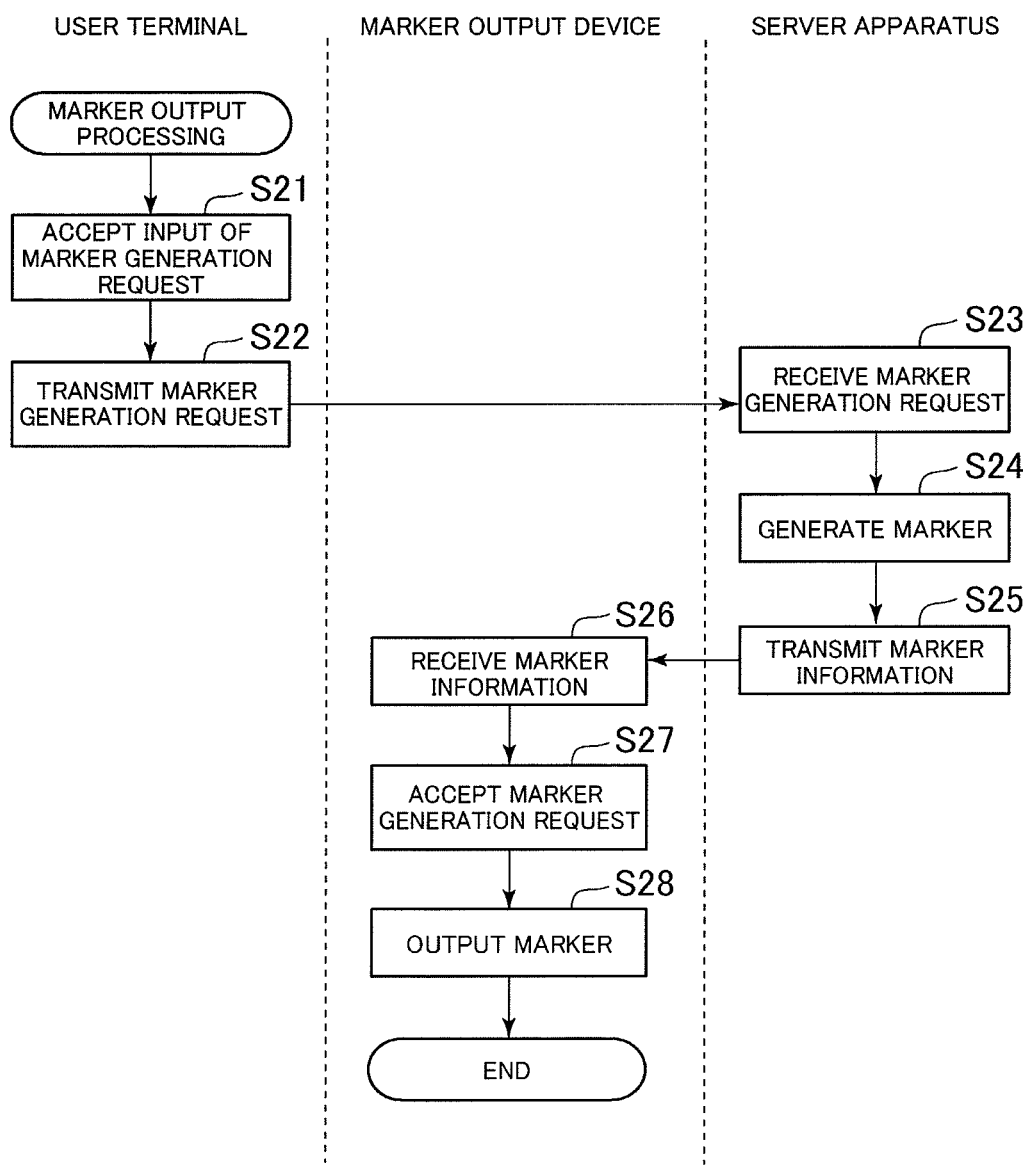
FIG. 11 is a diagram illustrating an example of processing of generating a marker corresponding to at least one of the embodiments of the present invention.

Processing of generating the marker to displaying the image of the plant by using the AR technology will be described with reference to a flowchart illustrated in FIG. 11. First, when the user performs a predetermined operation such as tapping, the user terminal accepts an input of the marker generation request (step S21). When the user terminal transmits the marker generation request (step S22), the server apparatus receives the marker generation request (step S23).

After a controller of the server apparatus has generated the marker (step S24), the server apparatus transmits the marker information (step S25), and the marker output device receives the marker information (step S26). When the marker output device accepts an input of a marker output request, the marker output device outputs the marker (step S28), and the marker output processing is completed.

Figure 12:
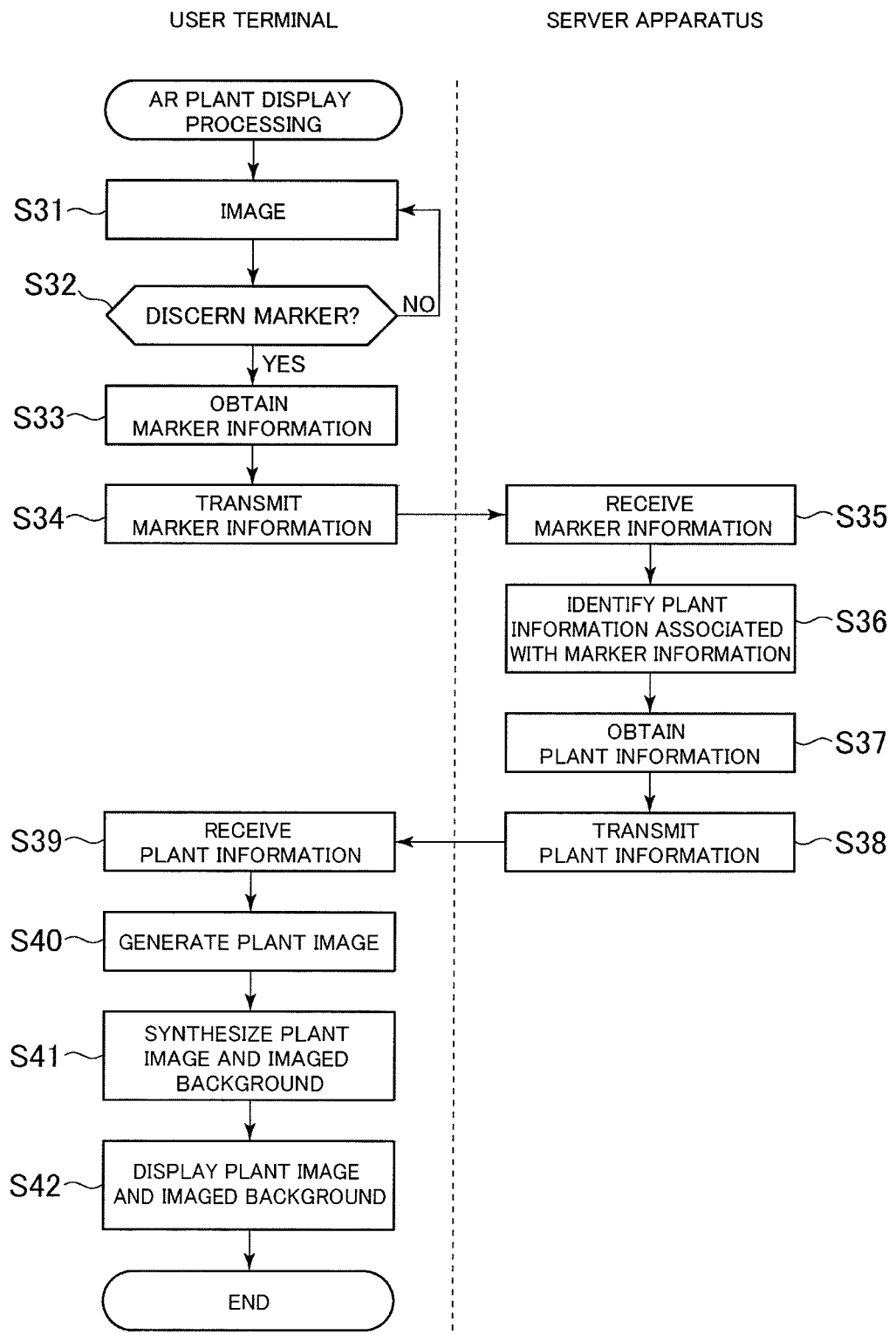
FIG. 12 is a diagram illustrating an example of processing of displaying a plant by using the AR technology corresponding to at least one of the embodiments of the present invention.

Processing of displaying the image of the plant by using the AR technology will be described with reference to a flowchart illustrated in FIG. 12. First, the marker and the background are imaged by the camera function of the user terminal (step S31).

At that time, in a case where the user terminal can discern the marker (YES in step S32), the user terminal obtains the marker information (step S33). In a case where the user terminal cannot discern the marker (NO in step S32), imaging by the user terminal is continued (step S31).

When the user terminal obtains the marker information (step S33), the user terminal transmits the marker information (step S34). When the server apparatus receives the marker information (step S35), plant information associated with the marker information is identified (step S36). After identifying and obtaining the plant information (step S37), the server apparatus transmits the plant information (step S38).

When the user terminal receives the plant information (step S39), the user terminal generates an image of the plant (step S40). After the image of the plant has been generated, the image of the plant and the imaged background are synthesized (step S41). The synthesized plant image and imaged background is displayed on the user terminal (step S42).

As described above, by continuously executing the imaging processing to the processing of displaying the plant image and the imaged background, a video of the imaged background and the plant is continuously displayed according to the change in the position or the direction of the user terminal.

Note that a mechanism of a markerless AR which does not generate the marker may be used. In a case where the mechanism of the markerless AR is used, by making the controller of the user terminal identify a place where a plant is provided as recognizing an enclosure of the flowerbed or the implantation as a marker, it is possible to display computer graphics of the plant which has been temporarily registered and the like on the display screen which is imaging the identified place.

Furthermore, the AR image may have a mode in which the designed flowerbed or implantation is converted into a two-dimensional image, the two-dimensional image of the plant is displayed on the display screen of the user terminal in a state where a display position of the two-dimensional image of the plant is fixed, and the two-dimensional image of the plant and the background image of the actual space imaged by a camera of the user terminal are superimposed and displayed. In the above mode, by superimposing the two-dimensional image of the plant on a place where it is planned to construct a flowerbed while changing the background image of the actual space imaged by the camera of the user terminal by an operation such as changing the direction or the position of the user terminal and the like, the user can grasp an entire image in a case where the flowerbed or the implantation is constructed.

The flowerbed state image transmission function has a function for transmitting information regarding an image indicating the state of the flowerbed drawn by the flowerbed state drawing function to the user terminal 1 via the communication interface 16.

The change instruction reception function has a function for receiving information regarding the viewpoint change instruction and/or the time change instruction input by the user from the user terminal 1 via the communication interface 16. When the viewpoint change instruction and/or the time change instruction is received, the flowerbed state drawing function draws an image according to the received change instruction, and the flowerbed state image transmission function transmits the image to the user terminal 1 via the communication interface 16.

The seedling number calculation function has a function for calculating information regarding the number of seeds and/or seedlings of the plant required when the flowerbed is formed based on the plant arrangement planning of the user. Note that the seedling number calculation function may further have a function for calculating intervals between the plants to be planted in each region included in the flowerbed and an estimated cost.

The seedling number transmission function has a function for transmitting the information regarding the number of seeds and/or seedings of the plant, which has been calculated by the seedling number calculation function, required when the flowerbed is formed based on the plant arrangement planning of the user to the user terminal 1 via the communication interface 16. Note that the seedling number transmission function may further have a function for receiving information regarding the intervals between the plants to be planted in each region included in the flowerbed and the estimated cost to the user terminal 1 via the communication interface 16.

The order request reception function has a function for receiving information regarding the order request regarding the seeds and/or the seedlings of the plant required when the flowerbed is formed based on the plant arrangement planning of the user from the user terminal 1 via the communication interface 16 and storing the information in the storage device 33. The order reception confirmation function has a function for confirming the information regarding the order request received by the order request reception function as order reception information.

Subsequently, the premise of the embodiment of the present invention will be described. One example of the embodiment of the present invention is, for example, an application to be installed to a smartphone. When the application is activated in the user terminal 1, as information regarding activation, for example, discern information applied to the user terminal 1 is obtained. In addition, to discern the user, a configuration may communicate with the server apparatus 3 and logs in by using a user's account which has been previously applied, or the discern information of the user terminal 1 which has been obtained at the time of activation may be transmitted to the server apparatus 3. The discern information of the user terminal 1 or the user's account at the time of login is unique data to discern the user and is stored in the server apparatus 3 as a user ID.

Personal information of the user is stored in the server apparatus 3 in association with the user ID. For example, items of the personal information to be stored include "name", "sex", "data of birth", "address", "phone number", "email address", "password", "payment method", "credit card number", "usage history", and the like. As the name of the user and the like, information input by the user at the time of the first use of the application is stored.

FIG. 4 is a diagram illustrating an example of a plant data table corresponding to at least one of the embodiments of the present invention. In a plant data table 41, a color 43 is stored in association with a plant 42. For example, when the plant 42 is "hydrangea", a plurality of colors such as "blue", "purple", "red", "pink", and "white" is stored as the color 43 in association with "hydrangea". In addition, in the plant data table 41, a planting time 44 suitable for planting the plant, an appreciation time 45 suitable for appreciation, and photograph data 46 are stored in association with the plant 42 and the color 43.

In the photograph data 46, data on plants viewed from a plurality of different directions or angles corresponding to the directions and the angles with respect to the flowerbed that can be input is stored in advance, and furthermore, for each of these directions and angles, a plurality of pieces of data is stored in advance in accordance with the elapsed time from a planting time. Here, the photograph data 46 is stored. However, object data defined by polygons may be stored. In the object data, a plurality of pieces of data is stored according to the elapsed time from the planting time of the plant.

Figure 5:
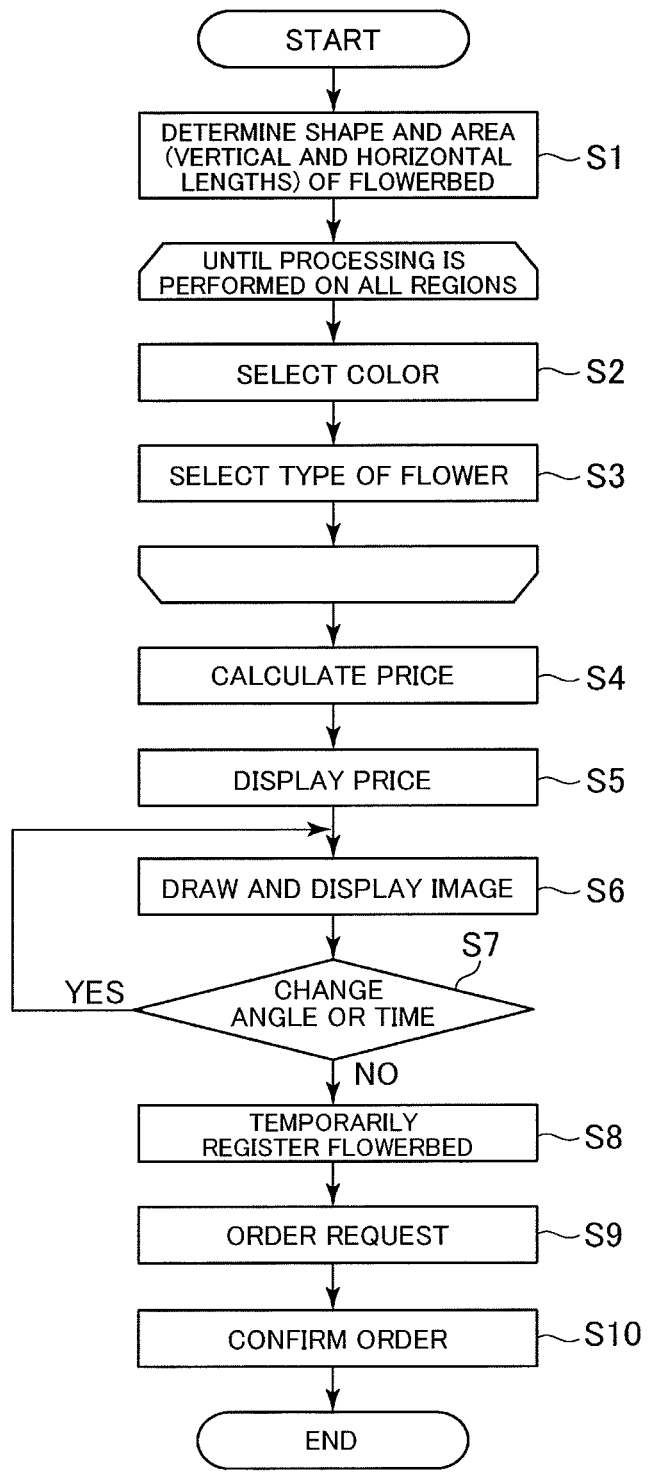
FIG. 5 is a diagram illustrating an example of a flowchart of a plant arrangement planning support processing corresponding to at least one of the embodiments of the present invention.

Subsequently, plant arrangement planning support processing corresponding to at least one of the embodiments of the present invention will be described. FIG. 5 is a diagram illustrating an example of a flowchart of a plant arrangement planning support processing corresponding to at least one of the embodiments of the present invention.

When flowerbed sales order processing is started, first, an input screen to input the information regarding the shape and the area of the flowerbed desired by the user is displayed on the display screen 13a, and the shape and the area of the flowerbed are determined by an operation such as tapping on the input screen and the like (step S1).

Figure 6:
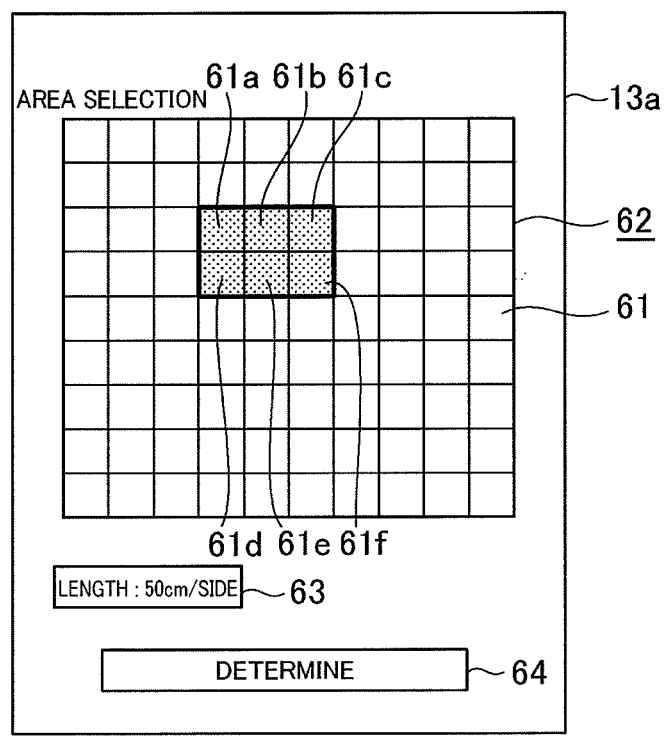
FIG. 6 is a schematic diagram illustrating an example of an input screen to input information regarding a shape and an area of a flowerbed corresponding to at least one of the embodiments of the present invention.

FIG. 6 is a schematic diagram illustrating an example of an input screen to input information regarding a shape and an area of the flowerbed. On the display screen 13a, a flowerbed shape input region 62 including a plurality of square cells 61, a length input region 63 to which an actual length corresponding to one side of the square cell 61 is input, and a determination button 64 for confirming the information input in the flowerbed shape input region 62 and the length input region 63 are displayed.

The user inputs the shape of the flowerbed by tapping the square cell 61 displayed on the display screen 13*a*. The square cell 61 tapped by the user is a square cell selected by the user as a region forming the shape of the flowerbed and is displayed in a different color. By displaying the selected square cell in a color different from that of the other square cells, the shape of the flowerbed can be clarified which is currently formed by the user's selection. In FIG. 6, the square cells 61*a* to 61*f* are displayed in a color different from that of the other square cells 61, and the shape formed by the square cells 61*a* to 61*f* becomes the shape of the flowerbed. Note that a mode indicating the square cell selected by the user may be a mode in which an outline of the shape formed by the selected square cells is displayed by a thick line or a colored line or a mode in which a pattern such as hatching is applied to the selected square cells.

When the user taps the length input region 63 displayed on the display screen 13*a*, lengths selectable as the actual length corresponding to the length of one side of the square cell 61 are displayed in a pull-down manner. The user selects a desired length from among the selectable lengths displayed in a pull-down manner to determine the area of the flowerbed. Note that the selectable length may be selected by directly inputting a value. The user taps the determination button 64 to determine the shape and the area of the flowerbed.

When the shape and the area of the flowerbed are determined in step S1, next, an input screen to input a color of each region forming the shape of the flowerbed is displayed on the display screen 13*a*, and the color of each region forming the shape of the flowerbed is determined by an operation such as tapping on the input screen (step S2).

Figure 7:
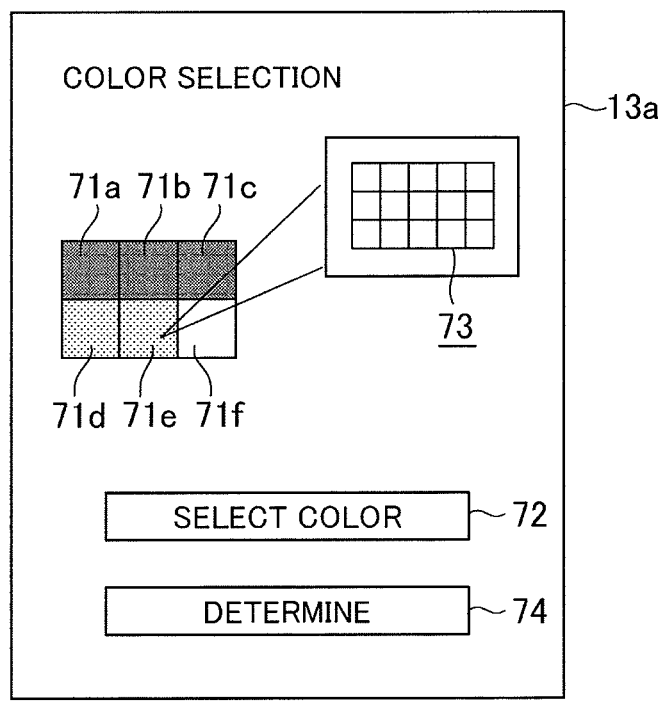
FIG. 7 is a schematic diagram illustrating an example of an input screen to input a color of each region forming a shape of a flowerbed corresponding to at least one of the embodiments of the present invention.

FIG. 7 is a schematic diagram illustrating an example of an input screen to input a color of each region forming a shape of a flowerbed. On the display screen 13*a*, a square cells 71 of plurality of square forming the shape of the flowerbed, a color selection start button 72, a color palette 73, and a determination button 74 for confirming input color information are displayed. The user taps the square cell 71 which is displayed on the display screen 13*a* as the region forming the shape of the flowerbed to select the square cell 71 to which the color is input. A plurality of square cells can be simultaneously selected as the square cells 71 to which the color is input.

Next, when the color selection start button 72 is tapped, the color palette 73 including a plurality of colors is displayed as a pop-up. The user selects a desired color from among the colors included in the color palette 73 to input the color to the selected square cell 71. Note that the color palette 73 may be displayed on the display screen 13*a* from the beginning without providing the color selection start button 72. Furthermore, a configuration may be used in which the color palette 73 is displayed as a pop-up when the square cell 71 to which the color is input is selected. When the determination button 74 is tapped in a state where the inputs of the colors to all the square cells 71 have been completed, the input of the color is completed.

In FIG. 7, square cells 71*a* to 71*c* are square cells to which the color has been already input, and the input color is displayed in the square cells 71*a* to 71*c*. Square cells 71*d* and 71*e* are square cells which are currently selected by the user as square cells to which colors are input. According to a mode for highlighting, displaying an outline by a thick line or a colored line, or applying a pattern such as hatching, it is clearly indicated that the square cells 71*d* and 71*e* are selected by the user. By selecting a color desired by the user from among the colors included in the color palette 73, the colors are input to the square cells 71*d* and 71*e*. A square cell 71*f* is a square cell to which a color is not input and is not selected as a square cell to which a color is input.

When the color of each region included in the flowerbed is determined in step S2, next, an input screen to input the type of the plant to be arranged and planted in each region is displayed on the display screen 13*a*, and the type of the plant to be planted in each region forming the shape of the flowerbed is determined by an operation such as tapping on the input screen and the like (step S3).

When the user selects the type of the plant in step S3, types of the plant which can be selected can be limited in advance according to the color determined in step S2. For example, in a case where the color determined in step S2 is "blue", it is possible that only the plant 42 having a color, which is same as the color determined in step S2, registered in the color 43 with reference to the plant data table 41 can be selected. With this configuration, there is no case where the type and the color of the plant desired by the user do not exist and the user needs to repeatedly make inputs, and convenience for the user can be enhanced.

In addition, in step S3, when the user selects the type of the plant, the type of the plant which can be selected can be limited in advance according to the planting time and the appreciation time of the plant. In this case, it is preferable that an input regarding the planting time and the appreciation time of the plant from the user be accepted before the user selects the color and the type of the plant. For example, in a case where an input of "April" is accepted as an appreciation time from the user, with reference to the plant data table 41, it may also be possible that only the plants 42 of which the appreciation time of "April" which is the same as the appreciation time input by the user is registered as the appreciation time 45 can be selected.

Figure 8:
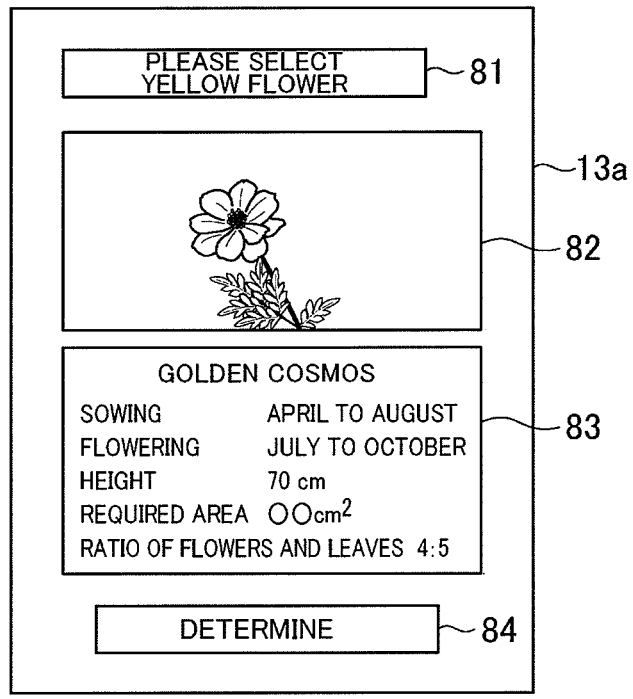
FIG. 8 is a schematic diagram illustrating an example of an input screen to input a type of a plant to be arranged and planted in each region forming a shape of a flowerbed corresponding to at least one of the embodiments of the present invention.

FIG. 8 is a schematic diagram illustrating an example of an input screen to input a type of a plant to be arranged and planted in each region forming a shape of a flowerbed. On the display screen 13*a*, a selection target color display column 81 in which a color to be selected is displayed, a plant image display column 82, a plant information display column 83, and a determination button 84 are displayed.

In FIG. 8, a comment "Please select a yellow flower" is displayed in the selection target color display column 81, and this indicates that the user is currently selecting a plant having a yellow color. The color selected in the selection target color display column 81 is one of the colors selected by the user in step S2.

In the plant image display column 82, an image of a plant having a flower or a leaf with a color of which the selection is instructed in the selection target color display column 81 is displayed. In the plant information display column 83, the plant information corresponding to the image displayed on the plant image display column 82 is displayed. The plant information displayed on the plant image display column 82 in FIG. 8 includes the name of the plant, a seeding time, a flowering time, a height, an area necessary for growth, and a ratio of flowers and leaves. In addition, shade tolerance, difficulty in plant growth, a price, and the like may be displayed. In addition, it may also be possible to configure that the images of the plurality of types of plants and/or the plurality of pieces of plant information are concurrently displayed.

The user selects a desired plant by an operation such as swiping on the display screen 13a and determines the type of the plant by an operation such as tapping on the determination button 84. In a case where the user has selected a plurality of colors in step S2, the above selection is made for each color.

In the above, a mode has been described in which the type of the plant corresponding to the selected color is selected after the colors of all the regions included in the flowerbed have been selected. However, it may also be possible that the color relative to at least one region included in the flowerbed is selected, and immediately after that, the type of the plant corresponding to the color is selected. For example, it may also be possible to configure so that the steps S2 and S3 are completed for each region included in the flowerbed. With this configuration, for the regions to which the same color is selected, different types of plants can be arranged and planted, and accordingly, a flowerbed with diversity can be formed.

When the color and the type of the plant are identified for each of the plurality of regions included in the flowerbed by the processing in steps S1 to S3, a price to form the flowerbed based on the plant arrangement planning is calculated (step S4). For example, a price per unit area or per region is determined for each plant or each color of the plant, a total price required for forming the flowerbed is calculated based on the plants selected in the plant arrangement planning. The calculated price is displayed on the display screen 13a (step S5).

When the arrangement of different colors and/or the different types of plants is identified for each of the plurality of regions included in the flowerbed, an image indicating the state of the flowerbed is drawn and is displayed on the display screen 13a (step S6). When the image indicating the state of the flowerbed is drawn, the photograph data 46 corresponding to the identified plant is extracted for each region included in the flowerbed with reference to the plant data table 41, and the photograph data according to the direction and the angle relative to the flowerbed is arranged. By performing the perspective transformation on the virtual space in which these photograph data is arranged as setting the center of the flowerbed as the focal point of the virtual camera, the image indicating the state of the flowerbed is generated.

In a case where the user issues the viewpoint change instruction and/or the time change instruction (YES in step S7), the image indicating the state of the flowerbed is drawn and is displayed on the display screen 13a based on the change instruction of the user (step S6). When the change in the direction and the angle relative to the flowerbed is input, the arranged photograph data is replaced with photograph data according to the changed direction relative to the flowerbed with reference to the plant data table 41, and an image is generated again. Furthermore, when the change in the time to be displayed is input by the user, the photograph data arranged for each region is replaced with photograph data corresponding to a changed time with reference to the plant data table 41, and an image is drawn again.

Figure 9:
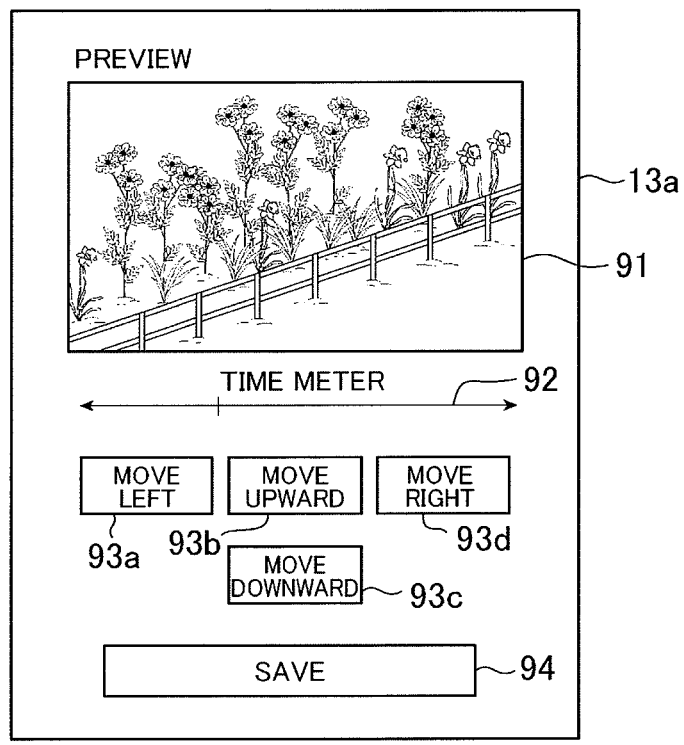
FIG. 9 is a schematic diagram illustrating an example of an input screen to input a viewpoint change instruction and/or a time change instruction corresponding to at least one of the embodiments of the present invention.

FIG. 9 is a schematic diagram illustrating an example of an input screen to input a viewpoint change instruction and/or a time change instruction. On the display screen 13a, an image display region 91, a time meter 92, a viewpoint change button 93, and an image save button 94 are displayed.

In the image display region 91, the image indicating the state of the flowerbed drawn in step S6 is displayed. The time meter 92 is a meter to instruct to change the time of the image displayed in the image display region 91, and one year is displayed as a bar. The user can change the state of the flowerbed displayed on the display screen 13a according to an elapsed time from the planting time of the plant by an operation such as swiping the time meter 92.

The viewpoint change button 93 is a button to instruct to change the viewpoint of the image, indicating the state of the flowerbed, to be drawn. The user can obtain an image viewed from the different direction or angle relative to the flowerbed by an operation such as tapping on the viewpoint change button 93. For example, when a viewpoint change button 93a is tapped, an image is displayed of which a viewpoint is moved by a predetermined distance to the left side with respect to a straight line connecting the viewpoint of the image indicating the state of the flowerbed to the center of the flowerbed displayed in the image display region 91. Furthermore, when a viewpoint change button 93d is tapped, an image is displayed of which a viewpoint is moved by a predetermined distance to the right side with respect to the straight line connecting the viewpoint of the image indicating the state of the flowerbed to the center point of the flowerbed displayed in the image display region 91. Furthermore, when a viewpoint change button 93b or 93c is tapped, an image is displayed in which the center of the flowerbed is viewed from a viewpoint which is obtained by moving the viewpoint of the image indicating the state of the flowerbed displayed in the image display region 91 upward or downward in a height direction by a predetermined distance.

Furthermore, in FIG. 9, a case where the direction and the angle relative to the flowerbed are discontinuously changed stepwise is illustrated. However, it is also possible to continuously change the direction and the angle relative to the flowerbed of the viewpoint change instruction. The continuous change in the direction and the angle relative to the flowerbed is, for example, made by an operation such as swiping the image display region 91. In this case, the viewpoint relative to the flowerbed is changed according to the direction and the length of the swipe.

The image save button 94 is an image to save the plant arrangement planning of the user corresponding to the image indicating the state of the flowerbed displayed in the image display region 91 and/or the image indicating the state of the displayed flowerbed in the user terminal 1 and/or the server apparatus 3. The saved image and the like can be shared by other users via the communication network 2. The shared image indicating the state of the flowerbed can be freely browsed by the users. The user can make a plant arrangement planning based on the shared image or plant arrangement planning which has been edited.

In a case where the user satisfies the image indicating the state of the flowerbed displayed on the display screen 13a in step S6, the viewpoint change instruction and/or the time change instruction is not issued (NO in step S7), and the user terminal 1 is operated and instructed. With this operation, the plant-arrangement-planned flowerbed can be temporarily registered, for example, can be put into a so-called "shopping cart" (step S8). The user can continue to make a plant arrangement planning for another flowerbed. By repeatedly executing the processing in steps S1 to S8, plant arrangement planning of a plurality of flowerbeds can be made, and the made flowerbeds can be put into the shopping cart. Accordingly, a procedure for collectively purchasing the flowerbeds can be performed.

By making the plant arrangement planning by the processing in steps S1 to S6, it is possible to log in the flowerbed sales order system again and order the flowerbed after logging out from the flowerbed sales order system as the flowerbed of which the shape has been identified and the color of each region and the type of the flower have been selected is stored in the server apparatus 3. Similarly, the flowerbed which has been temporarily registered by putting the flowerbed into the "shopping cart" can be stored in the server apparatus 3. The content of the flowerbed to which the plant arrangement planning has been made is stored in association with the discern information of the user terminal 1.

When the plant-arrangement-planned flowerbed is temporarily registered in step S8, an order button to confirm the order is displayed on the display screen 13a of the user terminal. Furthermore, a cost in a case where the flowerbed put into the shopping cart is ordered is displayed on the display screen 13a. Regarding the cost, a cost of an individual flowerbed put into the shopping cart and a total cost of the plurality of flowerbeds put into the shopping cart are displayed. After confirming the total cost in a case where the flowerbeds are ordered, the user can delete a part of the flowerbeds put into the shopping cart from the shopping cart or can make the plant arrangement planning regarding a part of the flowerbeds put into the shopping cart again. In a case where the plant arrangement planning of a part of the flowerbeds put into the shopping cart is revised, the processing in steps S1 to S8 is executed again on the flowerbeds to be revised.

When the order button is tapped by an operation instruction by the user, an order request is transmitted to the server apparatus 3 (step S9). In this case, all the flowerbeds put into the shopping cart and temporarily registered are subject to the order request. The user can order to deliver or to make the flowerbed based on the plant arrangement planning made by the user. In addition, the user can order seeds, seedlings, and the like of plants required for forming the flowerbed. The user may select whether to order to deliver or make the flowerbed or order only the delivery of the seeds, seedlings, and the like of the plants.

When the order request of the user is transmitted to the server apparatus 3 in step S9, the server apparatus 3 receives an order content, and the order content is stored in the storage device 33 of the server apparatus 3, and the order is confirmed (step S10). An operator of the sales order system according to the present invention prepares the ordered seeds and seedlings of the plants or forms a flowerbed according to the order content and delivers the product to a user's address which has been registered in advance.

In the mode described above, an embodiment with the system including the user terminal and the server apparatus has been described. However, the present invention can be applied to an embodiment using only the user terminal. In the embodiment using only the user terminal, the function performed by the server apparatus in the above mode is performed by the user terminal.

The invention claimed is:

1. A non-transitory computer-readable recording medium including a plant arrangement planning support program to make a computer device support a plant arrangement planning in a flowerbed causing the computer device to function as:
an arrangement identificator which identifies an arrangement of different colors and/or different types of plants for each of a plurality of regions included in a flowerbed;
a display data storage which stores display data corresponding to each plant;
an image drawer which draws an image indicating a state of the flowerbed according to a position of each region and each plant arranged in each region based on the display data stored in the display data storage, wherein the image drawer is capable of drawing an image viewed from a different direction and/or angle relative to the flowerbed; and
a plant selector which accepts selection of a plant to be arranged for each region by an operation instruction of a user,
wherein the arrangement identificator identifies the arrangement of the plant for each region according to the plant accepted by the plant selector, and
wherein the plant selector changes the plant of which the selection is accepted according to the time of planting and/or appreciation of the plant.

2. The non-transitory computer-readable recording medium including the plant arrangement planning support program according to claim 1, wherein
the image drawn by the image drawer is an image obtained by converting a state of a flowerbed in a virtual three-dimensional space into a two-dimensional image.

3. The non-transitory computer-readable recording medium including the plant arrangement planning support program according to claim 1, causing the computer device to function as:
an order request acceptor which accepts an order request by an operation instruction of the user; and
an order reception confirmer which confirms an order reception of the flowerbed according to the arrangement of the plant identified by the arrangement identificator when the order request is accepted.

4. A non-transitory computer-readable recording medium including a plant arrangement planning support program to make a computer device support a plant arrangement planning in a flowerbed causing the computer device to function as:
an arrangement identificator which identifies an arrangement of different colors and/or different types of plants for each of a plurality of regions included in a flowerbed;
a display data storage which stores a plurality of pieces of display data according to an elapsed time from a planting time of the plant for each plant;
an image drawer which draws an image indicating a state of the flowerbed for each elapsed time from the planting time of the plant according to the position of each region and the plant arranged in each region based on the display data stored in the display data storage; and
a plant selector which accepts selection of a plant to be arranged for each region by an operation instruction of a user,
wherein the arrangement identificator identifies the arrangement of the plant for each region according to the plant accepted by the plant selector, and
wherein the plant selector changes the plant of which the selection is accepted according to the time of planting and/or appreciation of the plant.

5. A plant arrangement planning support device to execute a support of a plant arrangement planning in a flowerbed, the device comprising:

an arrangement identificator configured to identify an arrangement of different colors and/or different types of plants for each of a plurality of regions included in a flowerbed;

a display data storage configured to store display data corresponding to each plant;

an image drawer configured to draw an image indicating a state of the flowerbed according to a position of each region and each plant arranged in each region based on the display data stored in the display data storage, wherein the image drawer is capable of drawing an image viewed from a different direction and/or angle relative to the flowerbed; and a plant selector which accepts selection of a plant to be arranged for each region by an operation instruction of a user, wherein the arrangement identificator identifies the arrangement of the plant for each region according to the plant accepted by the plant selector, and wherein the plant selector changes the plant of which the selection is accepted according to the time of planting and/or appreciation of the plant.

6. A plant arrangement planning support device to execute a support of a plant arrangement planning in a flowerbed, the device comprising:

an arrangement identificator configured to identify an arrangement of different colors and/or different types of plants for each of a plurality of regions included in a flowerbed;

a display data storage configured to store a plurality of pieces of display data according to an elapsed time from a planting time of the plant for each plant;

an image drawer configured to draw an image indicating a state of the flowerbed for each elapsed time from the planting time of the plant according to the position of each region and each plant arranged in each region based on the display data stored in the display data storage; and a plant selector which accepts selection of a plant to be arranged for each region by an operation instruction of a user, wherein the arrangement identificator identifies the arrangement of the plant for each region according to the plant accepted by the plant selector, and wherein the plant selector changes the plant of which the selection is accepted according to the time of planting and/or appreciation of the plant.

7. A plant arrangement planning support method to make a computer device support a plant arrangement planning in a flowerbed, the method comprising:

identifying an arrangement of different colors and/or different types of plants for each of a plurality of regions included in the flowerbed;

drawing an image indicating a state of the flowerbed according to a position of each region and each plant arranged in each region based on display data corresponding to each plant stored in a storage, wherein the drawing can draw an image viewed from a different direction and/or angle relative to the flowerbed;

accepting selection of a color and/or a plant to be arranged for each region by an operation instruction of a user;

identifying, in response to accepting selection, the arrangement of the color and/or the plant for each region according to the accepted color and/or the plant; and changing plants of which selection can be accepted according to a time of planting and/or appreciation of the plant.

8. A plant arrangement planning support method to make a computer device support a plant arrangement planning in a flowerbed, the method comprising:

identifying and arranging an arrangement of different colors and/or different types of plants for each of a plurality of regions included in the flowerbed;

drawing an image indicating a state of the flowerbed for each elapsed time from a planting time of the plant according to a position of each region and each plant arranged in each region based on a plurality of pieces of display data according to the elapsed time from the planting time of the plant for each plant stored in a storage;

accepting selection of a color and/or a plant to be arranged for each region by an operation instruction of a user;

identifying, in response to accepting selection, the arrangement of the color and/or the plant for each region according to the accepted color and/or the plant; and changing plants of which selection can be accepted according to a time of planting and/or appreciation of the plant.

9. A plant display system including a user terminal, a server apparatus capable of communicating with the user terminal, and a display device comprising:

a virtual space storage configured to store information regarding a state of a virtual space;

a plant information storage configured to store information regarding a state of a plant;

an image generator configured to generate images of the virtual space and the plant to be displayed on the display device according to a position and/or a direction of the display device;

an image display configured to display the generated images on the display device; and an arrangement identificator configured to identify an arrangement of different colors and/or different types of plants for each of a plurality of regions included in a flowerbed;

wherein the user terminal includes:

a plant selector which accepts selection of a color and/or a plant to be arranged for each region by an operation instruction of the user, wherein the arrangement identificator identifies the arrangement of the color and/or the plant for each region according to the color and/or the plant accepted by the plant selector, and wherein the plant selector changes plants of which selection can be accepted according to a time of planting and/or appreciation of the plant.

10. A plant display system including a user terminal and a server apparatus capable of communicating with the user terminal, the system comprising:

a storage configured to store information regarding a state of a plant and information regarding a marker associated with the information;

an imager configured to image the marker and a background;

a discerner configured to discern the marker;

a plant identificator configured to identify the plant from the discerned marker;

an image generator configured to generate an image of the identified plant; and an image display configured to display the generated image and the imaged background.

* * * * *